US012215841B2

(12) United States Patent
Wadhwa

(10) Patent No.: US 12,215,841 B2
(45) Date of Patent: Feb. 4, 2025

(54) APPARATUS FOR MIMICKING THE LIGHT AND SKY-CONDITIONS AT THE HORIZON

(71) Applicant: Abhay Wadhwa, New York, NY (US)

(72) Inventor: Abhay Wadhwa, New York, NY (US)

( * ) Notice: Subject to any disclaimer, the term of this patent is extended or adjusted under 35 U.S.C. 154(b) by 0 days.

(21) Appl. No.: 17/919,269

(22) PCT Filed: Apr. 15, 2021

(86) PCT No.: PCT/IN2021/050378
§ 371 (c)(1),
(2) Date: Oct. 16, 2022

(87) PCT Pub. No.: WO2021/210022
PCT Pub. Date: Oct. 21, 2021

(65) Prior Publication Data

US 2023/0167966 A1 Jun. 1, 2023

(30) Foreign Application Priority Data

Apr. 16, 2020 (IN) ............................. 202011016431

(51) Int. Cl.

| | |
|---|---|
| ***F21V 13/04*** | (2006.01) |
| ***F21S 6/00*** | (2006.01) |
| ***F21V 5/00*** | (2018.01) |
| ***F21V 7/06*** | (2006.01) |
| ***F21V 9/02*** | (2018.01) |

(Continued)

(52) U.S. Cl.
CPC .............. *F21V 13/04* (2013.01); *F21S 6/008* (2013.01); *F21V 5/008* (2013.01); *F21V 7/06* (2013.01); *F21V 9/02* (2013.01); *F21V 9/20* (2018.02); *F21V 23/003* (2013.01); *F21W 2121/008* (2013.01); *F21Y 2103/10* (2016.08); *F21Y 2115/10* (2016.08)

(58) Field of Classification Search
CPC . F21V 13/04; F21V 5/008; F21V 7/06; F21V 9/02; F21V 9/20; F21V 23/003; F21S 6/008; F21W 2121/008
See application file for complete search history.

(56) References Cited

U.S. PATENT DOCUMENTS 9,894,729 B2 * 2/2018 Forbis ..................... F21V 29/89
10,670,228 B2 6/2020 Di Trapani et al.
(Continued)

*Primary Examiner* — Tracie Y Green
*Assistant Examiner* — Michael Chiang
(74) *Attorney, Agent, or Firm* — Kevin J Fournier Intellectual Property Legal Services Ltd.; Kevin J Fournier

(57) ABSTRACT of the Invention Disclosed herein an apparatus for mimicking the light and sky-conditions at the horizon comprises a light assembly (2) provided with at least two angularly disposed horizontal strips (9*a* and 9*b*) of light source, a composite lens (5) fixedly placed above the light assembly (2) and configured to selectively reflect and transmit the light incident on it, a reflecting dome (3) centrally and partially disposed over the composite lens (5) and light assembly module (2) and provided with an LED spotlight (12) under it, a mounting bracket (4) adapted to receive the light assembly and the composite lens; and a controller (11) configured to control and monitor one or more predetermined parameters of the light source (9), wherein the characteristic of the composite lens (5) is translated depending on the desired geographical location. A corresponding method for mimicking the light and sky-conditions at the horizon is also disclosed.

19 Claims, 3 Drawing Sheets

(51) Int. Cl.

| | |
|---|---|
| ***F21V 9/20*** | (2018.01) |
| ***F21V 23/00*** | (2015.01) |
| *F21W 121/00* | (2006.01) |
| *F21Y 103/10* | (2016.01) |
| *F21Y 115/10* | (2016.01) |

(56) References Cited

U.S. PATENT DOCUMENTS

| | | | | |
|---|---|---|---|---|
| 10,775,021 | B2 | 9/2020 | Di Trapani et al. | |
| 2014/0254154 | A1* | 9/2014 | Catalano | F21V 13/10<br>362/243 |
| 2015/0373806 | A1* | 12/2015 | Vissenberg | H05B 45/20<br>315/151 |
| 2016/0025273 | A1 | 1/2016 | van de Ven et al. | |
| 2019/0186714 | A1* | 6/2019 | Bergman | F21S 8/033 |
| 2024/0142085 | A1* | 5/2024 | Pickard | F21S 8/006 |

* cited by examiner

Actual Scenario

Mimicked Scenario

APPARATUS FOR MIMICKING THE LIGHT AND SKY-CONDITIONS AT THE HORIZON

FIELD OF THE INVENTION

The present invention relates to an apparatus for mimicking the light and sky-conditions at the horizon. More particularly, the present invention pertains to an apparatus that replicates the light and sky-conditions of the horizon of various cities in an interior environment.

BACKGROUND OF THE INVENTION

Light is a stimulus that has a great influence on the human. It creates an impact on the psychology of an individual. Human psychology is impacted differently by different types of light. The wrong type of light at the wrong time can negatively impact us by creating imbalance in the inner ear which further disturbs one's ability of sleep at the right part of the circadian cycle, especially for those who exhibit problems with syncing, therefore, altogether reinforcing the disturbance in the circadian rhythm. These individuals include those who experience neurological disorders such as dementia or Alzheimer's, or others who can't get necessary amounts of sleep because they face imbalance in their inner ear and hence, suffer from circadian rhythm sleep disorders.

It is a problem faced by many worldwide. The circadian system of humans is greatly influenced by daylight. Circadian rhythm in humans is endogenous, which is adjusted to the local environment by external cues which include light. The natural light at the horizon helps an individual's circadian system to regulate rhythmicity in the body and establishes normal sleep and wake phases by balancing the inner ear. Therefore, a lighting pattern that replicates the natural daylight can help these patients to undergo a normal circadian rhythm and provide a direct connection with the patterns in nature.

Literature survey reveals that biomimicking the horizon and seeing it can assist in easing the ailments of patients suffering from cardiac rhythm malfunctioning, motion sickness, and sleep disorders. Many inventions based on this understanding of biomimicking were made to solve the above ailments. Some of the most popular ones were treatment or healing enhancement through light therapy or visual therapy or colour therapy where the patient is required to devote his/her time in a specially designed environment and carry out the actions as directed by the therapist. Despite all this, such therapies or treatments are not capable of providing a permanent solution to their respective problems.

Below are the details of prior arts that have attempted to solve the problems as addressed above in the past.

US20140117877A1 discloses a natural daylight emulating light fixtures and systems, wherein the system employs at least one lighting assembly for providing light simulating natural light. The lighting assembly has several light engines around a light well. The light engines each have a number of light sources capable of providing light to the light well. A controller calculates lighting parameters for natural light received at a location on earth, at a day of the year and time of day. The controller then selectively operates light sources to provide light of a calculated spectrum and intensity that simulates light of a given direction. A master controller may be employed to control a group of lighting assemblies, or to control several different groups which may be simulating natural light relating to different locations, time of day or day of the year parameters.

U.S. Ser. No. 10/502,374B2 discloses a light fixture, e.g., as an artificial skylight, in which light within a region defined by x, y color coordinates exits through a first light engine, and light within a region defined by other x, y color coordinates exits through a second light engine. Also, light fixtures in which a second light engine comprises a sidewall, and light exiting a first light engine passes through space defined by the sidewall; light fixtures in which first and second light engines are able to output light providing different CS values at a luminance; light fixtures wherein light incident on a surface of the fixture and cumulative light exiting the fixture have different color points; light fixtures wherein light distribution characteristics of light engines differ; and/or other features. The invention also relates to corresponding methods.

US20090273302A1 discloses an artificial window comprising a light box having a rear wall and a planar diffuser arrangement in front of the rear wall. The artificial window further comprises at least one first light source extending between the rear wall and the diffuser, a window frame in front of the diffuser, and drivers arranged for operating the light source, and electrically connected to the light source. The artificial window also comprises at least one additional light source electrically connected to one of said drivers, which additional light source radiates light in substantially one direction and is arranged to radiate light onto a portion of the front side of the diffuser arrangement during operation.

U.S. Pat. No. 5,251,392A discloses an artificial window comprises a box having a rear wall, and walls bounding an interior space which faces longitudinally forwardly; sheet structure extending laterally crosswise of the space, and a viewable pattern associated with the sheet structure to be illuminated by light passing forwardly from the box interior; first and second light sources in the box; a reflector structure in the box to reflect light from the first source in a direction toward the sheet structure for effecting illumination of the viewable pattern; and there being control structure for controlling the illumination of the viewable pattern to independently, differentially, and progressively change the illumination of the viewable pattern.

U.S. Pat. No. 5,426,879A discloses a natural daylight window simulation unit includes a thin supporting structure, a sheet of transparent material with imprinted indicia thereon representing a view, supported in this structure, and a thin, natural-like daylight backlighting system provided in supporting structure for supplying evenly diffused backlighting to the sheet of transparent material, to create in combination with the imprinted transparency a simulation unit supplying natural daylight especially to a windowless interior. The simulated daylight window units can be made in the form of a window or a skylight or a door with window panels.

In none of the above prior arts, there is provided a system or apparatus capable of clearly and efficiently mimicking the light and sky-condition at the horizon prior to and post the occurrence of sunrise and sunset. Even though the apparatuses that are emulating the sky-conditions involves a lot of complexity in the structure as they are not modular, once the light sources and diffuser units are arranged in a specified relative orientation, the emulated skylights would be restricted as per the features and potential of the diffuser units and the light source, and in such cases, there is no provision of customizing the placement and characteristics of the diffuser unit or reflecting surfaces or lens in order to get the most accurate and clear desired light and sky-condition of a particular location. In addition to the above, in the systems and methods of the prior arts, the provided diffuser units or lenses in combination with light sources are not sufficiently improved in terms of their restricted characteristics, customization and modularity, so as to unable to create a clear and accurate moments of sunrise, sunset and the period between sunrise and sunset at the horizon of any location in the world.

As detailed above, there are various solutions that have been provided according to the existing arts, but all these solutions still have challenges existing because of the limited applications and features due to the employment of limited features of the diffuser unit in combination with the light source, thus rendering the systems to create unclear, inaccurate and undesirable skylight conditions, which are costly and complicated too.

It is, therefore, important to work on the alternative solution to develop a modular improved apparatus which without performing a therapy or treatment, balances the inner ear and well-being of the individuals and also reinforces the circadian rhythm, and at the same, obviates the complexity and challenges of the prior arts.

SUMMARY OF THE INVENTION

This Patent manifests the concept of biomimicry by emulating the design and systems of nature for solving complex human problems.

The mimicked moments of sunrise and sunsets at the horizon created in the apparatus can also act against motion sickness. It is caused by inner ear and eyes sending conflicting information to the brain while one is moving. Looking constantly at the horizon can help in stabilizing an individual's posture and sickness caused due to continuous motion while travelling in the sea. Focusing at a distinct point on the horizon serves as a point of reference that allows individuals to sense the difference between their body's natural motion and the motion of the ship and further, it can stabilize body posture by balancing the inner ear.

Therefore, in the present invention, to create balance in the inner ear, the light and sky condition at the horizon is mimicked (biomimicry) through an apparatus and a method, such that when an individual observes the mimicked light and sky condition in the apparatus, creates balancing in the inner ear.

In this Patent, there is an attempt to make an apparatus which acts as a healer for balancing inner ear that further helps in overcome against circadian rhythm sleep disorder in people. The apparatus mimics the light and sky-conditions at horizon and create visual effects of moments of sunrise and the sunset, which will in turn have an impact on the person's psychology. The moment of sunrise signifies the beginning of the day and energizes the individuals to start their new day, similarly the moments of sunset marks the end of the day and help individuals to relax.

It is an objective of the present invention to provide an apparatus which is capable of mimicking the light and sky-conditions of any predetermined geographical location at a given point of time.

It is an objective of the present invention to provide an apparatus which is capable of mimicking the moments of sunset and sunrise at the horizon.

It is an objective of the present invention to provide an apparatus which is capable of inducing attention of humans by exposing them to the light and sky-conditions at horizon of different moments of sunset and sunrise.

It is an objective of the present invention to provide an apparatus which is capable of mimicking clear and accurate light and sky-conditions at the horizon corresponding to any geographic location.

It is an objective of the present invention to provide an apparatus for mimicking light and sky-conditions at the horizon which is modular, and its components are customizable.

It is an objective of the present invention to provide an apparatus and method for mimicking light and sky-conditions at the horizon, and when the light and sky-conditions are perceived by an individual, circadian rhythm is improved and the problem of motion sickness is healed.

The various objectives and embodiments of present invention as presented herein are understood to be illustrative and not restrictive and are non-limiting with respect to the scope of the invention.

A term "desired light and sky-conditions" has been used in various embodiments, paragraphs and claims of the present invention, it includes the visual conditions and parameters of light and sky for all the moments occurring before and after sunset and sunrise of any geographic location in the world. It also includes the visual conditions and parameters of light and sky between the moments of sunset and sunrise and vice versa. Most preferably, the visual conditions and parameters of light and sky are corresponding to the light conditions of sea and mountains at, above and below the horizon.

A term "angularly disposed" has been used in various embodiments, paragraphs and claims of the present invention, this term is referred for the defining the placement of the light sources. To be more precise, it conveys the angular placement of LED strips or angular placement of LED lights among themselves, wherein the angles are between the LED lights of their corresponding LED strips. Preferably, the angular arrangement of LED lights in one of the strips with the LED lights of the other strip is usually constant, which means the angle between any pair LEDs, each from their respective strip is same as the angle between any other pair of LEDs, each from their respective pair.

A term "optical layers" has been used in various embodiments, paragraphs and claims of the present invention, which mainly includes lenses or any reflecting or refracting surfaces or a combination of the above in order to impart characteristics to the combination for producing the desired light and sky-conditions, wherein the characteristics of the optical layer can be changed depending on the desired light and sky-conditions. Irrespective of the combination, optical layers is configured to selectively reflect, transmit and filter the light wavelength as per the desired light and sky-conditions of the geographic location.

A term "controller" has been used in various embodiments, paragraphs and claims of the present invention, which includes power source or any equipment controlling the parameters of the light source (intensity and color) as per the desired light and sky conditions at the horizon of a particular geographic location, wherein visual effects corresponding to the desired light and sky conditions at the horizon is changed as per the instruction received by the controller. The instructions that the controller initiates include producing light and sky conditions at the horizon of a predetermined geographic location, and accordingly changing the parameters essential to create the same.

In accordance with one embodiment of the present invention, there is provided an apparatus for mimicking the light and sky-conditions at the horizon comprises a light assembly provided with at least two horizontal strips of light source, wherein each said strip comprises of a plurality of LED lights arranged in series, a composite lens fixedly placed above the light assembly and configured to selectively reflect and transmit the light incident on it, a reflecting dome centrally and partially disposed over the composite lens and light assembly module and provided with an LED spotlight under it, a mounting bracket adapted to receive the light assembly and the composite lens and a controller configured to control and monitor one or more predetermined parameters of the light source, and wherein said horizontal strips are angularly disposed relative to each other in order to enable the light emitted from the horizontal strips strike the composite lens at various angle of incidence with the horizontal for reflecting, transmitting and interfering/diffusing to form a composite light corresponding to lights of the desired light and sky-conditions at a specific time of a predetermined geographic location.

In accordance with just above embodiment of the present invention, wherein said desired light and sky-conditions at a specific time of a predetermined geographic location corresponding to said composite light is visualized on the front surface of the composite lens.

In accordance with one of the above embodiments of the present invention, said composite lens is formed from a combination of a plurality of optical layers stacked upon one another to selectively filter the wavelengths emitted from the horizontal strips of light source as per the desired light and sky-conditions at a specific time of a predetermined geographic location.

In accordance with one of the above embodiments of the present invention, wherein the combination of a plurality of optical layers stacked upon one another effectively forms the composite lens, wherein the characteristic of the composite lens is formulated by translating the light and sky conditions of the desired geographical location into mimicking the same, wherein the composite lens is selected and employed in the apparatus based on the light and sky conditions of the desired geographical location.

In accordance with one embodiment of the present invention, there is provided an apparatus for mimicking the light and sky-conditions at the horizon comprises a light assembly provided with at least two horizontal strips of light source, wherein each said strip comprises of a plurality of LED lights arranged in series, a composite lens fixedly placed above the light assembly and configured to selectively reflect and transmit the light incident on it, a reflecting dome centrally and partially disposed over the composite lens and light assembly module and provided with an LED spotlight under it, a mounting bracket adapted to receive the light assembly and the composite lens and a controller configured to control and monitor one or more predetermined parameters of the light source, and wherein said horizontal strips are angularly disposed relative to each other in order to enable the light emitted from the horizontal strips strike the composite lens at various angle of incidence with the horizontal for reflecting, transmitting and interfering/diffusing to form a composite light corresponding to lights of the desired light and sky-conditions at a specific time of a predetermined geographic location, wherein said composite lens is formed from a combination of at least three optical layers stacked upon one another to selectively filter the wavelengths emitted from the horizontal strips of light source as per the desired light and sky-conditions at a specific time of a predetermined geographic location.

In accordance with just above embodiment of the present invention, wherein said optical layers altogether combining to form the composite lens are selected from dichroic lens, ribbed lens, prismatic lens and mirror, wherein the characteristic of said composite lens is variably modified depending on the predetermined geographic location and is used in different combinations of ribbed lens, prismatic lens and mirror.

In accordance with one embodiment of the present invention, wherein the apparatus employs the controller for indicating the passage of time corresponding to the desired light and sky-conditions at the specific time of the predetermined geographic location by optimizing the angle between the LEDs of the strips and the light intensity from the strips of light source.

In accordance with one embodiment of the present invention, wherein another desired light and sky-conditions at a specific time of a predetermined geographic location is obtained by optimizing the angle between the LEDs of the strips and light intensity from the strips of light source and alternating the relative placements and characteristics of the optical layers and the selected combination of the optical layers.

In accordance with one of the above embodiments of the present invention, wherein said various angle of incidence with the horizontal of light emitted from the strip the with the composite lens is equal to or more than 0 degree but always less than 90 degrees.

In accordance with one embodiment of the present invention, there is provided an apparatus for mimicking the light and sky-conditions at the horizon comprises a light assembly provided with at least two horizontal strips of light source, wherein each said strip comprises of a plurality of LED lights arranged in series, a composite lens fixedly placed above the light assembly and configured to selectively reflect and transmit the light incident on it, a reflecting dome centrally and partially disposed over the composite lens and light assembly module and provided with a single LED spotlight under it, a mounting bracket adapted to receive the light assembly and the composite lens and a controller configured to control and monitor one or more predetermined parameters of the light source, and wherein said horizontal strips are angularly disposed relative to each other in order to enable the light emitted from the horizontal strips strike the composite lens at various angle of incidence with the horizontal for reflecting, transmitting and interfering/diffusing to form a composite light corresponding to lights of the desired light and sky-conditions at a specific time of a predetermined geographic location, wherein said composite light contains spectral wavelengths corresponding to the lights of the desired light and sky-conditions at the specific time of the predetermined geographic location, wherein said spectral wavelengths are distributed as per the actual light conditions of different coordinates of the desired light and sky-conditions at the horizon.

In accordance with one of the above embodiments of the present invention, wherein the LED spotlight is either on or off depending on the desired moments of light and sky condition of the predetermined geographic location, wherein, when the LED spotlight is on, light emitted from the LED spotlight is incident on to the dome to mimic the sun at or above the horizon on the front surface of the composite lens.

In accordance with a preferred embodiment of the present invention, wherein, said light sources are 2 LED strips making an angle of 30° with each other and one LED spotlight, wherein said light sources are powered by energy sources through the controller, wherein said each strip comprises of a plurality of LED lights arranged in series and LEDs of one strip makes an angle of 30° with the LEDs of another strip producing light, wherein half portion of reflecting dome is disposed on to the light assembly and its remaining half portion is made to be disposed onto the composite lens, wherein the each strip produces light of intensities as per the desired dynamic light and sky-conditions at the horizon.

In accordance with one exemplary embodiment of the present invention, wherein said combination of the plurality of optical layers is having at least three layers, wherein a dichroic lens forms the second layer in combination with ribbed lens or prismatic lens or both as third layer, wherein, dichroic lens are coated with exotic materials onto its surface forming the first layer or front surface of the composite lens, wherein, said exotic materials are preferably chosen from quartz crystals and metal oxides, wherein, light of a definite wavelength emitted from the light source first strikes the mirror finish, and from thereon, it is reflected and transmitted through all the layers to strike and reflect the transmitted light resulting into diffusion of light into the composite light containing wavelength corresponding to the desirable light and sky-conditions, which is further visualized on the front surface of the composite lens as the desired light and sky-conditions at the horizon.

In accordance with just above embodiment of the present invention, wherein, horizon is formed upon powering the apparatus through controller, it resembles the sunset or sunrise depending on the requirement of the user for a predetermined period of time, wherein, predetermined time is the timeframe between sun starts to set or rise and ends setting or rising completely, preferably, in accordance with the present invention, when light sources are switched on, said apparatus displays the horizon for sunrise or sunset from 30 minutes before the sunset or sunrise till 30 minutes after the sunset or sunrise, however, the above timeframe is amenable to modifications depending on the requirement, and has the ability to get configured to form horizon in synchrony with the actual horizon in real time.

In accordance with the above exemplary embodiment of the present invention, wherein, any desired light and sky-conditions on front surface of the composite lens is a function of used dichroic lens in the optical layers, wherein, by changing the characteristics of the dichroic lens or by using a completely different dichroic lens with varying characteristics, it is possible to replicate any kind of light and sky-conditions as desired on this earth.

According to the present invention, wherein, upon supplying power to the light sources through the controller, the LED strips, the combination of optical layers, and glass half reflecting dome synergistically interact among each other to mimic the light and sky-conditions as desired sunset, wherein, by varying the variables such as angle of incidence with the horizontal at the composite lens, and intensity of light, and by varying other variables simultaneously or independently such as relative arrangement and material of dichroic lens, prismatic lens and ribbed lens, formation of desirable light and sky-conditions of a specific place at a given time can be achieved.

According to the above exemplary embodiments of the present invention, it is observed that by changing the angle of incidence with the horizontal of lights emitted from the LED strips with the orange dichroic lens and the angle of incidence with the horizontal of transmitted light with the half glass reflecting dome, the different moments of sunrise and sunsets can be obtained by producing the desired composite light. Similarly, desired composite light corresponding to the desirable light and sky-conditions can be obtained by changing the kind of dichroic lens or its relative placement with other optical layers, the wavelength emitted from the LED strips and the angle at which the light strikes the dichroic lens and the glass dome.

In accordance with one exemplary embodiment of the present invention, when the predetermined light and sky-conditions is the moment just before the sunrise, an Orange Dichroic lens is used in the combination of plurality of optical layers as the second layer, and keeping mirror as first layer and prismatic lens as the third layer (front surface of the composite lens), lights from one of the LED strips strikes the dichroic lens at an angle of incidence with the horizontal of 60 degrees causing the lights to spread less and enabling the transmission and reflection of light through the plurality of optical layers causing the light to fall on the half glass reflecting dome at an angle of 60 degrees causing to form the composite light corresponding to the moment of light and sky-conditions just before the sunrise, wherein the upper and the lower part of the composite lens are observed to be primarily dark, wherein the composite light corresponds to the multiple shades of light in orange and yellow appearing on moving down the upper part of the composite lens till the middle portion or from where horizon starts and on moving further down, it starts to turn on the darker side from where the horizon starts appearing, wherein, there are mostly spikes of yellow light seen on the upper half of the composite lens because of the light falling on the half glass reflecting dome at an angle of 60 degrees, the composite light striking the lower part of the composite lens below the horizon corresponds to the light wavelength found in the ocean. While the above desired light and sky conditions is obtained, the other LED strip and LED spotlight are kept off.

In accordance with one exemplary embodiment of the present invention, when the predetermined light and sky-conditions is the moment just at the time of sunrise, an Orange Dichroic lens is used in the combination of plurality of optical layers as the second layer, and keeping mirror as first layer and prismatic lens as the third layer (front surface of the composite lens), lights from one of the LED strips strikes the dichroic lens at an angle of incidence with the horizontal of 60 degrees and lights from another LED strip strikes the dichroic lens at an angle of 90 degrees, the spread of light is relatively more than light spread in the above exemplary embodiment, enabling the transmission and reflection of light through the plurality of optical layers causing the light to fall on the half glass reflecting dome at an angle of 60 and 90 degrees, further diffusing to form the composite light corresponding to the moment of light and sky-conditions at the time of sunrise, there are mostly spikes of orange and yellow light seen on the upper half of the composite lens because of the light falling on the half glass reflecting dome at an angle of 60 and 90 degrees, wherein the composite light corresponds to the multiple shades of light in orange and yellow appearing on moving down the upper part of the composite lens till the middle portion or from where horizon starts and on moving further down, it starts to turn on the darker side from where the horizon starts appearing, wherein, the composite light striking the lower part of the composite lens below the horizon corresponds to the light wavelength found in the ocean, and in this case the LED spotlight is kept on.

In accordance with one exemplary embodiment of the present invention, when the predetermined light and sky-conditions is the moment just after the sunrise at horizon, an Orange Dichroic lens is used in the combination of plurality of optical layers as the second layer, and keeping mirror as first layer and prismatic lens as the third layer (front surface of the composite lens), lights from one of the LED strips strikes the dichroic lens at an angle of incidence with the horizontal of 90 degrees the transmission and reflection of light through the plurality of optical layers causing the light to fall on the half glass reflecting dome at an angle of 90 degrees further diffusing to form the composite light corresponding to the moment of light and sky-conditions just after the sunrise, there are mostly spikes of smooth merge orange and yellow light seen on the upper half of the composite lens because of the light falling on the half glass reflecting dome at an angle of 90 degrees wherein the composite light corresponds to the smooth merge of shades of light in orange and yellow appearing on moving down the upper part of the composite lens till the middle portion or from where horizon starts and on moving further down, it starts to turn on the darker side from where the horizon starts appearing, wherein, the composite light striking the lower part of the composite lens below the horizon corresponds to the light wavelength found in the ocean. While the above desired light and sky conditions is obtained, the other LED strip is kept off and the LED spotlight is kept on, wherein depending on the desirable light and sky-conditions of different moments throughout the day and night, the controller control and monitor the predetermined parameters such as angle between the two linear LEDs and their colour tunability and the LED spotlight, and accordingly a light vector is created that altogether works with the scalar characteristics of the lens to create the desired light and sky conditions at the horizon.

DETAILED DESCRIPTION OF THE INVENTION

Figure 1:
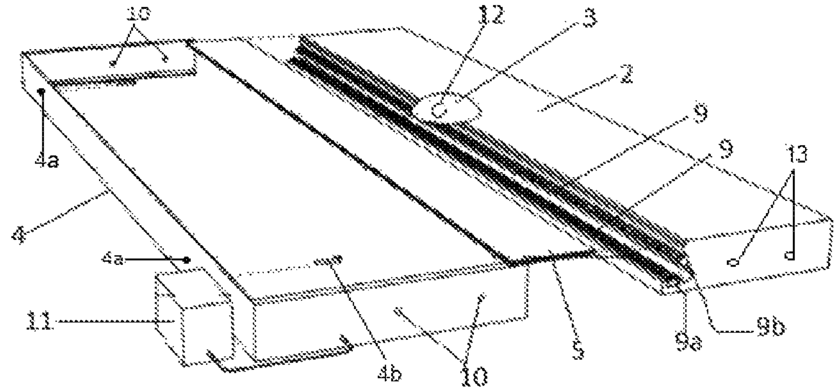
FIG. 1 shows exploded view of the apparatus for mimicking the light and sky condition at the horizon.

In accordance with one embodiment of the present invention, there is provided a method for mimicking the light and sky-conditions at the horizon comprising instructing to mimicking the desired light and sky-conditions at a specific time of a predetermined geographic location, emitting lights in a predetermined range of spectral wavelength from a plurality of angularly disposed light source and optionally from another light source, striking the emitted lights angularly at various angle of incidence with the horizontal onto a combination of a plurality of optical layers for reflecting and transmitting the lights, diffusing the reflected and transmitted lights from and through the combination of a plurality of optical layers to form a composite light corresponding to the desired light and sky-conditions at the specific time of the predetermined geographic location followed by visualizing the mimicked desired light and sky-conditions and wherein the method comprises of reflecting and transmitting the lights angularly and selectively from and through the combination of the plurality of optical layers for filtering out the emitted lights to form the composite light as per the instruction for the desired light and sky-conditions at the specific time of the predetermined geographic location.

In accordance with just above embodiment of the present invention, wherein said optical layers altogether combining to form the composite lens are selected from dichroic lens, ribbed lens, prismatic lens and mirror, wherein the characteristic of said composite lens is variably modified depending on the predetermined geographic location and is used in different combinations of ribbed lens, prismatic lens and mirror.

In accordance with one of the above embodiments of the present invention, wherein the method comprises of controlling and transitioning the passage of time corresponding to the desired light and sky-conditions by optimizing the angle of incidences with the horizontal and light intensities of the plurality of light source.

In accordance with one of the above embodiments of the present invention, wherein the method comprises of obtaining another desired light and sky-conditions at a specific time of a predetermined geographic location by controlling and optimizing the angle of incidences with the horizontal, light intensities, and alternating the relative placements and characteristics of the optical layers and the selected combination of the optical layers, wherein said plurality of optical layers are at least three in number and are stacked upon one another to selectively filter the wavelengths emitted from the plurality of light source as per the desired light and sky-conditions at the specific time of the predetermined geographic location.

In accordance with one of the embodiments of the present invention for the method, wherein said various angle of incidence with the horizontal of light emitted from the plurality of light source is equal to or more than 0 degree but always less than 90 degrees, wherein said composite light contains spectral wavelengths corresponding to the lights of the desired light and sky-conditions at the specific time of the predetermined geographic location, wherein said spectral wavelengths are distributed as per the actual light conditions of different coordinates of the desired light and sky-conditions at the horizon, wherein the light emitted from the plurality of light source is in visible range of spectral wavelength, wherein the light filtered out from and through the plurality of optical layers to form the composite light contains spectral wavelength in the range of 470 nm to 640 nm.

In accordance with one of the embodiments of the present invention for the method, wherein the combination of a plurality of optical layers stacked upon one another effectively forms the composite lens (5), wherein the characteristic of the composite lens is formulated by translating the light and sky conditions of the desired geographical location into mimicking the same, wherein the composite lens is selected and employed in the apparatus based on the light and sky conditions of the desired geographical location.

Referring to FIG. 1, an exploded view of the apparatus for mimicking the light and sky conditions at the horizon is shown. The apparatus comprises of a light assembly (2) provided with angularly disposed two horizontal strips (9*a* and 9*b*) of light source, wherein each said strip (9*a* or 9*b*) comprises of a plurality of LED lights (9) arranged in series, wherein the LEDs are angularly arranged along the horizontal length of the apparatus in said strips (9*a* and 9*b*) for emitting lights in visible range of wavelength for illuminating front surface of the composite lens (5) with the desired light and sky conditions at the horizon. The emitted lights from the angularly disposed strips are selectively reflected and refracted from and through the composite lens (5) at the various angle of incidences with the horizontal ranging from 0 to less than 90 degrees for diffusing with the lights to form the composite light, wherein the composite light contains all sets of wavelengths corresponding to the desired light and sky conditions at the horizon of the predetermined location and strikes the front surface to produce the visual effects of the desired light and sky conditions at the horizon. Also, there is provided an LED spotlight (12) disposed just under the reflecting dome to mimic the appearance of the sun at or above the horizon by striking lights on to the dome which is corresponding to the light appearance of the sun. A controller (11) is provided to control the light source's parameters such as power supply, light intensity and angles at which the lights are being emitted. Other than the above, the apparatus is provided with mounting options (10) for affixing or hanging it to or from any wall or surfaces. The mounting bracket (4) is provided with mounting holes (4*a*) on its top for mounting the mounting bracket on to a wall or any surface with the help of screw (4*b*). Also, the mounting brackets are provided with joiner (10) on its inner side surfaces for affixing with the complimentary joiner (13) provided on the outer side surfaces of the light assembly (2), therefore, when the light assembly (2) is received into the mounting bracket (4), it is affixed with the mounting bracket (4) via the engagement between the joiner (10) and complimentary joiner (13).

Figure 2A:
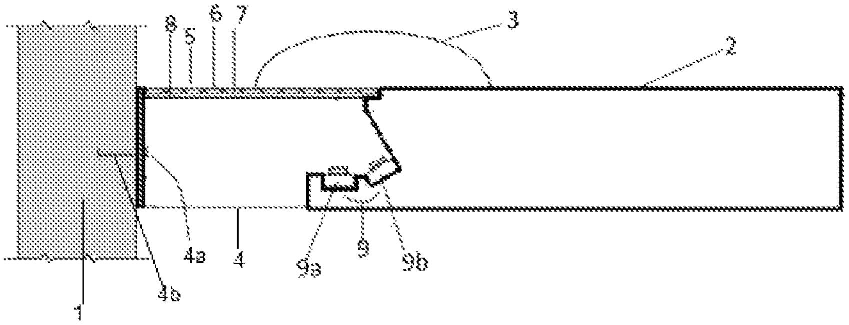
FIG. 2*a* shows the side view of the apparatus for mimicking the light and sky condition at the horizon.
Figure 2B:
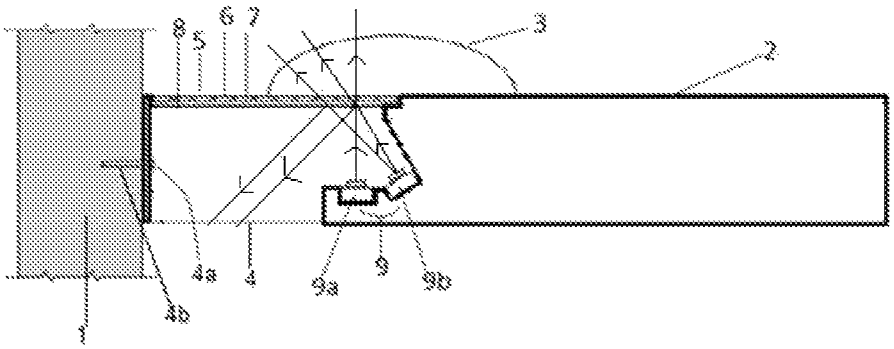
FIG. 2*b* shows the ray tracing of the lights emitted from the LED strip to form the composite light corresponding to the light and sky condition at the horizon.

Referring to FIGS. 2*a* and 2*b*, a side cross-sectional view of the apparatus for mimicking the light and sky conditions at the horizon is shown. It shows the angular arrangement between the horizontal LED strips (9*a* and 9*b*), wherein the LEDs (9) contained in the strips emit lights in the visible range for the reflection and refraction from and through the composite lens (5), wherein the composite lens (5) comprises of three optical layers (6, 7 and 8) stacked one above the other, wherein a dichroic lens (7) forms the second layer in combination with ribbed lens (6) or prismatic lens (6) or both as third layer, wherein, dichroic lens (7) are coated with exotic materials onto its surface forming the first layer as mirror (8), wherein, said exotic materials are preferably chosen from quartz crystals and metal oxides, wherein, light of a definite wavelength emitted from the light source (9) first strikes the mirror (8) at a certain angle, and from thereon, it is reflected and transmitted through all three layers resulting into diffusion of light into the composite light (T) containing wavelength corresponding to the desirable light and sky-conditions, producing the visual effects of the desired light and sky-conditions at the horizon, wherein the reflected light (R) from the composite lens (5) is has a wavelengths complimentary to the wavelengths transmitted via the composite lens (5). The half portion of glass dome (3) is disposed onto the light assembly (2) and the other half portion is disposed onto the composite lens (5). The mounting bracket (4) is mounted on to the wall (1) with the help of screw (4*b*) fixed through mounting holes (4*a*).

Figure 3:
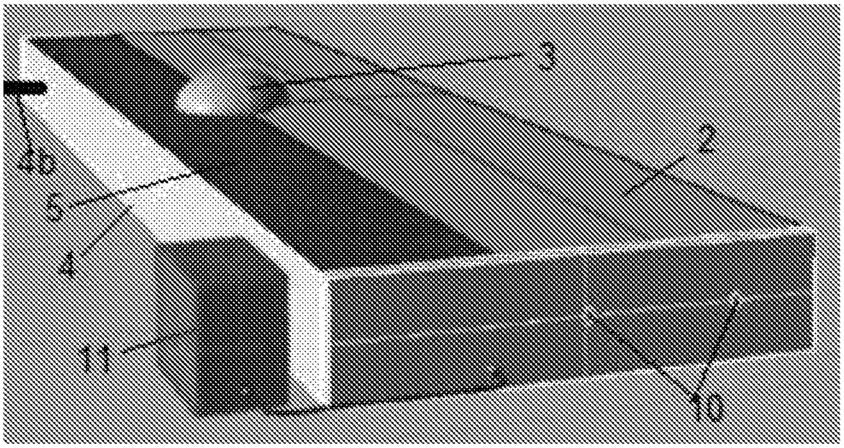
FIG. 3 shows the isometric view of the apparatus for mimicking the light and sky condition at the horizon.

Referring to FIG. 3, a perspective view of the apparatus for mimicking the light and sky conditions at the horizon is shown. The apparatus has reflecting dome (3), light assembly (2) and composite lens (5) and which are altogether joined to form the front surface of the apparatus. The composite lens (5) and light assembly (2) are attached with each other along their horizontal length, wherein the composite lens (5) is disposed on to the mounting bracket (4) above the light assembly (2) and at the junction of the composite lens (5) and light assembly (2), the reflecting dome (3) is disposed from the top sharing its perimeter partially with the composite lens (5) and light assembly (2). The joiner (10) provided on the sides of the apparatus for holding the light assembly (2) inside the mounting bracket (4). Also, the screw (4*b*) is passed through the mounting holes on the top of the mounting bracket (4) for mounting against any wall or surface.

In accordance with one embodiment of the present invention, the composite lens is made up of a combination of multiple optical layers which in altogether forms an appropriate lens (composite lens), wherein the appropriate lens (composite lens) is customizable as per the desired light and sky conditions at the horizon of a predetermined geographic location. Therefore, depending on the requirement of a user, a different customized appropriate lens (composite lens) is employed in the apparatus to create the light and sky conditions at the horizon of the desired geographic location The characteristics of the appropriate lens (composite lens) is formulated as per the light and sky conditions at the horizon of the desired geographic location, so that at any time, if a user wants to observe the light and sky conditions at the horizon of his choice of geographic location, he can simply select the appropriate lens (composite lens) designed for mimicking the light and sky conditions at the horizon of that particular geographic location and employ the same as the composite lens in the apparatus and observe the light and sky conditions at the horizon as desired from the particular geographic location.

In accordance with just above embodiment of the present invention, the characteristics of the appropriate lens (composite lens) for a particular geographic location is formulated by translating the real corresponding scenario of the light and sky conditions at the horizon into mimicking the light and sky conditions at the horizon. Usually, multiple points in the real scenario of the light and sky conditions at the horizon are marked and accordingly the different dominant wavelengths at each of those points are calculated and further, corresponding to each of those dominant wavelengths, chromaticity coordinates are calculated using MATLAB programming. Therefore, while designing an appropriate lens (composite lens) for a particular geographical location, the characteristics of the appropriate lens (composite lens) along its x-y axis is determined as per the obtained chromaticity coordinates. The formulated characteristic of the appropriate lens (composite lens) is such that it enables interference of multiple wavelengths to form the same dominant wavelengths corresponding to each of the above marked points in the real scenario of the light and sky conditions at the horizon after reflecting and transmitting lights received from the light source and accordingly, the light and sky condition corresponding to the marked points is being mimicked in the apparatus.

Figure 4:
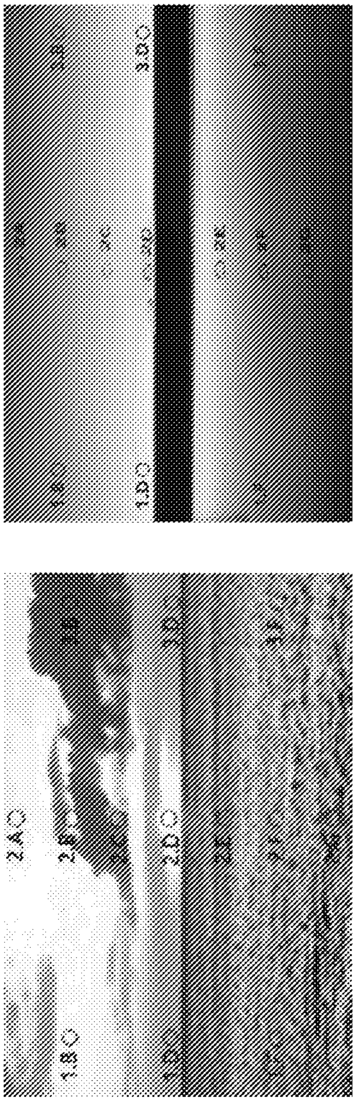
FIG. 4 shows the translation of light and sky conditions of a particular geographic location into mimicking it.

In accordance with one exemplary embodiment, the characteristics of the appropriate lens (composite lens) for a particular geographic location is formulated by translating the real corresponding scenario of the light and sky conditions at the horizon into mimicking the light and sky conditions at the horizon. Referring to FIG. 4, for translating the real scenario of the light and sky conditions at the horizon of a particular geographical location into mimicking it with the help of the appropriate lens (composite lens)—Firstly, a total of seven (2A, 2B, 2C, 2D, 2E, 2F and 2G) and three concurrent points (1B, 1D, 1F, 3B, 3D and 3F) are marked across the vertical real scenario of the light and sky conditions, wherein said three concurrent points are marked on either side of the seven concurrent points, wherein, points 2A, 2B and 2C are above the horizon, 2D is at the horizon and 2E, 2F and 2G are below the horizon, wherein, points 1B and 3B are above the horizon, 1D and 3D are at the horizon and 1F and 3F are below the horizon. Further, the different dominant wavelengths at each of the marked points are calculated accordingly and corresponding to each of those dominant wavelengths, chromaticity coordinates are calculated using MATLAB programming. Therefore, while designing an appropriate lens (composite lens) for a particular geographical location, the characteristics of the appropriate lens (composite lens) along its x-y axis is determined as per the obtained chromaticity coordinates since each such chromaticity coordinate represent a dominant wavelength and its complimentary wavelength which is emitted upon reflecting, transmitting and diffusing the light on to the said points, wherein said concurrent points marked across the vertical real scenario of the light and sky conditions are referenced for formulating the characteristic of the appropriate lens (composite lens) so as to enable interference of multiple wavelengths to form the same dominant wavelengths corresponding to each of the above marked points in the real scenario of the light and sky conditions at the horizon after reflecting and transmitting lights received from the light source and accordingly, the light and sky condition corresponding to the marked points is being mimicked in the apparatus.

In accordance with just above embodiment of the present invention, the reference for mimicking real light and sky conditions at the horizon of a particular geographical location is taken from the multiple pictures (more than 100) of various moments of real light and sky-conditions at the horizon light throughout the day and night clicked on the days of solstices and equinoxes of the year, wherein the positioning of seven (2A, 2B, 2C, 2D, 2E, 2F and 2G) and three concurrent points (1B, 1D, 1F, 3B, 3D and 3F) marked across the vertical real scenario of the light and sky conditions remains same in all the cases, wherein the aggregate of the dominant wavelengths of each of the marked points is statistically calculated and corresponding to each of those aggregated dominant wavelengths, chromaticity coordinates are calculated using MATLAB programming. Therefore, while designing an appropriate lens (composite lens) for a particular geographical location, the characteristics of the appropriate lens (composite lens) along its x-y axis is determined as per the obtained chromaticity coordinates since each such chromaticity coordinate represent a aggregated dominant wavelength and its complimentary wavelength which is emitted upon reflecting, transmitting and diffusing the light on to the said points, wherein said concurrent points marked across the vertical real scenario of the light and sky conditions are referenced for formulating the characteristic of the appropriate lens (composite lens) so as to enable interference of multiple wavelengths to form the same aggregated dominant wavelengths corresponding to each of the above marked points in the real scenario of the light and sky conditions at the horizon after reflecting and transmitting lights received from the light source and accordingly, the light and sky condition corresponding to the marked points is being mimicked in the apparatus.

While the invention is amenable to various modifications and alternative forms, some embodiments have been illustrated by way of example in the drawings and are described in detail above. The intention, however, is not to limit the invention by those examples and the invention is intended to cover all modifications, equivalents, and alternatives to the embodiments described in this specification.

The embodiments in the specification are described in a progressive manner and focus of description in each embodiment is the difference from other embodiments. For same or similar parts of each embodiment, reference may be made to each other.

It will be appreciated by those skilled in the art that the above description was in respect of preferred embodiments and that various alterations and modifications are possible within the broad scope of the appended claims without departing from the spirit of the invention with the necessary modifications.

Based on the description of disclosed embodiments, persons skilled in the art can implement or apply the present disclosure. Various modifications of the embodiments are apparent to persons skilled in the art, and general principles defined in the specification can be implemented in other embodiments without departing from the spirit or scope of the present disclosure. Therefore, the present disclosure is not limited to the embodiments in the specification but intends to cover the most extensive scope consistent with the principle and the novel features disclosed in the specification.

I claim:

1. An apparatus for mimicking the light and sky-conditions at the horizon comprises:

a light assembly (2) provided with at least two horizontal strips (9*a* and 9*b*) of light sources, wherein each said strip (9) comprises of a plurality of LED lights (9) arranged in series;

a composite lens (5) fixedly placed above the light assembly (2) and configured to selectively reflect and transmit the light incident on it;

a reflecting dome (3) centrally and partially disposed over the composite lens (5) and light assembly (2) and provided with an LED spotlight (12) under it;

a mounting bracket (4) adapted to receive the light assembly and the composite lens; and a controller (11) configured to control and monitor one or more predetermined parameters of the light sources (9); and wherein said horizontal strips (9*a* and 9*b*) are angularly disposed relative to each other in order to enable the light emitted from the horizontal strips (9*a* and 9*b*) to strike the composite lens (5) at various angles of incidence with the horizontal for reflecting, transmitting and interfering/diffusing to form a composite light corresponding to lights of a set of desired light and sky-conditions at a specific time of a predetermined geographic location; and wherein another set of desired light and sky-conditions at another specific time of another predetermined geographic location is obtained by optimizing the angle between the LEDs (9) of the strips (9*a* and 9*b*) and light intensity from the strips (9*a* and 9*b*) of the light sources and alternating the relative placements and characteristics of optical layers of the composite lens (5) and a selected combination of the optical layers of the composite lens (5).

2. The apparatus as claimed in claim 1, wherein said desired light and sky-conditions at the specific time of the predetermined geographic location corresponding to said composite light is visualized on a front surface (6) of the composite lens (5).

3. The apparatus as claimed in claim 1, wherein said composite lens (5) is formed from a combination of a plurality of optical layers stacked upon one another to selectively filter the wavelengths emitted from the horizontal strips (9*a* and 9*b*) of light sources as per the desired light and sky-conditions at the specific time of the predetermined geographic location.

4. The apparatus as claimed in claim 3, wherein the combination of a plurality of optical layers stacked upon one another effectively forms the composite lens (5), wherein the characteristic of the composite lens is formulated by translating the light and sky conditions of the desired geographical location into mimicking the same, wherein the composite lens is selected and employed in the apparatus based on the light and sky conditions of the desired geographical location.

5. The apparatus as claimed in claim 1, wherein said composite lens (5) is formed from a combination of at least three optical layers (6, 7 and 8) stacked upon one another to selectively filter the wavelengths emitted from the horizontal strips (9*a* and 9*b*) of the light sources as per the desired light and sky-conditions at the specific time of the predetermined geographic location.

6. The apparatus as claimed in claim 5, wherein said optical layers, altogether combining to form the composite lens, are selected from a dichroic lens (7), a ribbed lens (6), a prismatic lens (6), and a mirror (8), wherein the characteristics of said composite lens are variably modified depending on the predetermined geographic location and are used in different combinations of the ribbed lens (6), the prismatic lens (6) and the mirror (8).

7. The apparatus as claimed in claim 1, wherein the apparatus employs the controller (11) for indicating the passage of time corresponding to the desired light and sky-conditions at the specific time of the predetermined geographic location by optimizing the angle between the LEDs (9) of the strips (9*a* and 9*b*) and the light intensity from the strips (9*a* and 9*b*) of the light sources.

8. The apparatus as claimed in claim 1, wherein said various angles of incidence with the horizontal of light emitted from the strips (9*a* and 9*b*) and with the composite lens (5) are equal to or more than 0 degrees but always less than 90 degrees.

9. The apparatus as claimed in claim 1, wherein said composite light contains spectral wavelengths corresponding to the lights of the desired light and sky-conditions at the specific time of the predetermined geographic location, wherein said spectral wavelengths are distributed as per the actual light conditions of different coordinates of the desired light and sky-conditions at the horizon.

10. The apparatus as claimed in claim 1, wherein, the LED spotlight (12) is either on or off depending on the desired moments of light and sky condition of the predetermined geographic location, wherein, when the LED spotlight (12) is on, light emitted from the LED spotlight (12) is incident on to the dome to mimic the sun at or above the horizon on the front surface (6) of the composite lens (5).

11. A method for mimicking the light and sky-conditions at the horizon comprising:

receiving instructions by a controller for mimicking a desired light and sky-conditions at a specific time of a predetermined geographic location;

emitting lights in a predetermined range of spectral wavelength from a plurality of angularly disposed light sources and from another light source;

striking the emitted lights angularly at various angles of incidence with the horizontal onto a combination of a plurality of optical layers (6,7 and 8) for reflecting and transmitting the lights;

diffusing the reflected and transmitted lights from and through the combination of a plurality of optical layers (6,7 and 8) to form a composite light corresponding to the desired light and sky-conditions at the specific time of the predetermined geographic location followed by visualizing the mimicked desired light and sky-conditions; and wherein the method comprises of reflecting and transmitting the lights angularly and selectively from and through the combination of the plurality of optical layers (6,7 and 8) for filtering out the emitted lights to form the composite light as per the instruction for a set of the desired light and sky-conditions at the specific time of the predetermined geographic location; and wherein the method comprises of obtaining another set of desired light and sky-conditions at another specific time of another predetermined geographic location by controlling and optimizing the angles of incidences with the horizontal, light intensities, and alternating the relative placements and characteristics of the optical layers (5) and the selected combination of the optical layers (5).

12. The method as claimed in claim 11, wherein said optical layers, altogether combining to form a composite lens, are selected from a dichroic lens (7), a ribbed lens (6), a prismatic lens (6), and a mirror (8), wherein the characteristics of said composite lens (7) are variably modified depending on the predetermined geographic location and are used in different combinations of the ribbed lens (6), the prismatic lens (6) and the mirror (8).

13. The method as claimed in claim 11, wherein the method comprises of controlling and transitioning the passage of time corresponding to the desired light and sky-conditions by optimizing the angles of incidences with the horizontal and light intensities of the plurality of light sources.

14. The method as claimed in claim 11, wherein said plurality of optical layers are at least three (6, 7 and 8) in number and are stacked upon one another to selectively filter the wavelengths emitted from the plurality of light sources as per the desired light and sky-conditions at the specific time of the predetermined geographic location.

15. The method as claimed in claim 11, wherein the combination of a plurality of optical layers stacked upon one another effectively forms [the] a composite lens (5), wherein the characteristic of the composite lens is formulated by translating the light and sky conditions of the desired geographical location into mimicking the same, wherein the composite lens is selected and employed in the apparatus based on the light and sky conditions of the desired geographical location.

16. The method as claimed in claim 11, wherein said various angles of incidence with the horizontal of light emitted from the plurality of light sources are equal to or more than 0 degree but always less than 90 degrees.

17. The method as claimed in claim 11, wherein said composite light contains spectral wavelengths corresponding to the lights of the desired light and sky-conditions at the specific time of the predetermined geographic location, wherein said spectral wavelengths are distributed as per the actual light conditions of different coordinates of the desired light and sky-conditions at the horizon.

18. The method as claimed in claim 11, wherein the light emitted from the plurality of light sources is in visible range of spectral wavelength.

19. The method as claimed in claim 11, wherein the light filtered out from and through the plurality of optical layers to form the composite light contains spectral wavelength in the range of 470 nm to 640 nm.

* * * * *